United States Patent [19]

Zhu

[11] Patent Number: 5,822,592

[45] Date of Patent: Oct. 13, 1998

[54] METHOD AND SYSTEM FOR DETERMINING SOURCE CODE LOCATION

[75] Inventor: Jianhua Zhu, Lafayette, Colo.

[73] Assignee: US West Technologies, Inc., Englewood, Colo.

[21] Appl. No.: 791,668

[22] Filed: Jan. 30, 1997

Related U.S. Application Data

[63] Continuation of Ser. No. 268,088, Jun. 28, 1994, abandoned.

[51] Int. Cl.$^6$ ....................................................... G06F 9/45
[52] U.S. Cl. ........................... 395/705; 395/702; 395/707
[58] Field of Search .................................... 395/705, 703, 395/708, 702, 707

[56] References Cited

U.S. PATENT DOCUMENTS

| | | | |
|---|---|---|---|
| 4,677,550 | 6/1987 | Ferguson | 395/600 |
| 5,175,856 | 12/1992 | Van Dyke et al. | 395/700 |
| 5,202,986 | 4/1993 | Nickel | 395/600 |
| 5,371,747 | 12/1994 | Brooks et al. | 395/183.14 |
| 5,414,836 | 5/1995 | Baer et al. | 395/183.14 |
| 5,522,036 | 5/1996 | Shapiro | 395/183.14 |

OTHER PUBLICATIONS

Aho et al., "Compilers Principles, Techniques, and Tools," Addison–Wesley Publishing Co., Reading, MA, pp. 416, 463, & 473–478, 1988.

*Primary Examiner*—Emanuel Todd Voeltz
*Assistant Examiner*—Peter J. Corcoran, III
*Attorney, Agent, or Firm*—Brooks & Kushman P.C.

[57] ABSTRACT

A first improved method is disclosed for constructing a parse tree. The parse tree includes parse tree node records including a child pointer field, a sibling pointer field and an end position field. The improvement comprises storing information in the end position field. The information being selected from the group of an end position value and a parent node address. A second improved method is disclosed for identifying a source code segment associated with a first parse tree node record. The improvement comprises the step of determining the start position of the source code segment based on a variant field of the first node record and a variant field of a second node record. The improvement further comprises the step of determining the end position of the source code segment based on the variant field of the first node record.

4 Claims, 3 Drawing Sheets

5,822,592

METHOD AND SYSTEM FOR DETERMINING SOURCE CODE LOCATION

This is a continuation of application Ser. No. 08/268,088 filed on Jun. 28, 1994, now abandoned.

TECHNICAL FIELD

This invention relates generally to managing source code segments within a computer system. In particular, this invention relates to methods for storing and determining the location of a source code segment associated with a record in a parse tree.

BACKGROUND ART

Computer aided software engineering ("CASE") tools have existed since the early 1980's. Many CASE tools use graphical notations to represent program source code. These graphical notations are intended to convey structural or semantic information of the original source code. They are further intended to serve as an effective visual aid for understanding the logic of a program.

For systems incorporating CASE tools to be most useful, it is necessary to provide the facility to trace an abstract graphical notation to the underlying source code segment which it represents. For example, in a control flow graph, where each node corresponds to a segment of source code, it is useful to know the location of the source code segment associated with each node.

Information regarding the location of a source code segment typically includes the start position and end position of the source code segment. Many CASE tools require such information. A test coverage analysis system based on control flow, for example, needs such information for identifying which portion of the source code needs further testing. Such information is also crucial for a change management system for identifying and limiting the scope of changes.

Generally, the prior art solutions to the problem of associating abstract graphical representations with source code segment locations fall into two categories. The first category of solutions includes CASE tools which store actual source code segments along with parse tree nodes. The second category includes CASE tools which store references to source code segments.

Approaches of the first category are typically faster than solutions of the second category. The large amount of memory required, however, make these approaches impractical for many applications.

Approaches of the second category, although not as fast as the first category, are subject to potentially unacceptable levels of performance degradation. Although these approaches use memory more efficiently, they still require two units of memory for each code segment. These approaches require fields for start position and end position.

There are other types of approaches to the problem of associating parse tree nodes with source code segments, but they are less desirable than the two aforementioned approaches. One approach requires a parser to insert a first statement at the beginning of a grammar rule and a second statement at the end of a grammar rule. Although this allows an identification of starting and ending position, it only works for trivial language specifications.

Another approach requires enhancement to lexical analysis routines. This approach requires the lexical analysis routines to store the starting position and the ending position of the terminal symbols before returning control to the parser. This approach has two drawbacks: non-localized, distributed functionality and statement irregularity.

Distributing the functionality among lexical analysis routines results in additional complexity. Accordingly, maintaining and changing such routines are complex. Further, the irregularity of statements required to record references results in potentially error-prone application development.

DISCLOSURE OF THE INVENTION

A need therefore exists for an improved method for identifying a source code segment associated with a node in a parse tree. More particularly, a need exists for an improved method for identifying a source code segment associated with a parse tree node which uses memory resources more efficiently without significant performance degradation.

The present invention described and disclosed herein comprises a first improved method for constructing a parse tree and a second improved method for identifying a source code segment associated with a parse tree node record.

It is an object of the present invention to provide an improved method for constructing a parse tree having parse tree node records. Each parse tree node record includes a variant field for storing end positions and parent node pointers.

It is another object of the present invention to provide an improved method for identifying a source code segment associated with a parse tree node record based on a variant field for storing end positions and parent node pointers.

In carrying out the above objects and other objects of the present invention, a first method is provided for constructing a parse tree. The parse tree includes a plurality of nodes represented by parse tree node records. Each record is associated with a source code segment having a start position and an end position.

The method begins with the step of storing a first value in a child pointer field of the record. The first value is either nil or a child node address.

The method continues with the step of storing a second value in a sibling pointer field of the record. The second value is either nil or a sibling node address.

The next step of the method is storing a third value in an end position field of the record. According to the prior art, the third value directly indicates the end position of the source code associated with the node.

The present invention, however uses the end position field as a variant field. According to the present invention, the third value can contain either a value directly indicating an end position, or a parent node address.

The third value is a parent node address in the case of right-most sibling nodes. In all other cases, the third value directly indicates an end position of a source code segment.

In carrying out the above objects and other objects of the present invention, a second method is provided for identifying a source code segment associated with a first node record. The method begins with the step of determining the start position of the source code segment based on the end position field of a second node record.

The method continues with the improved step of determining the end position of the source code segment. In accordance with the present invention, the end position is determined based on an end position field interpreted as a variant field.

According to the present invention, the value of the variant field can contain either a value directly indicating an end position, or a parent node address. The value is interpreted indirectly, as a pointer, in the case of a right-most sibling node. The value is interpreted as directly indicating an end position in all other cases.

The objects, features and advantages of the present invention are readily apparent from the detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which reference characters indicate corresponding parts in all of the views, wherein.

BEST MODES FOR CARRYING OUT THE INVENTION

Figure 1:
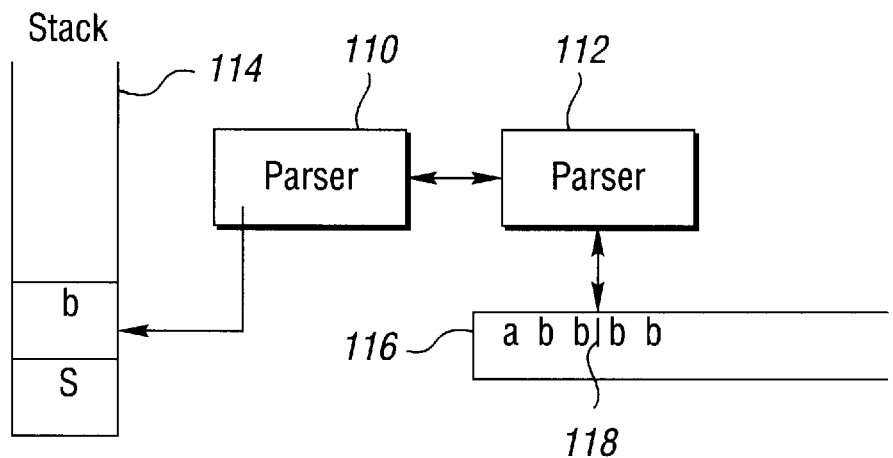
FIG. 1 is a functional block diagram illustrating the environment of the methods of the present invention.

Referring now to the drawings, FIG. 1 illustrates the environment of the methods of the present invention. As shown, the environment of the present invention includes a parser 110 and a scanner or lexical analyzer 112.

The parser 110 of the preferred embodiment is a parser generated using "Yet Another Compiler-Compiler" ("YACC"), a utility described in numerous industry papers. Parser 110, generated by YACC, belongs to the class of LALR(1) parsers, which scan tokens from left to right, construct derivation trees from the bottom up, and make state transition decisions with only a single token look-ahead.

YACC generated parsers, such as parser 110, assume the existence of lexical analyzers, such as lexical analyzer 112, that supplies terminal symbols on demand from input stream 116. Input stream 116 is typically a source file. Lexical analyzer 112 maintains a cursor 118 in the source file for its own operation. Cursor 118 is sufficient for providing source code location information during parsing.

LALR(1) parsers work are driven by a finite automaton with the assistance of a pushdown device or stack 114. LALR(1) parsers perform two primary activities: shift; and reduce.

During the shift activity, parser 110 directs lexical analyzer 112 to provide a terminal symbol read from input stream 116. Parser 110 places the terminal symbol onto stack 114. During the reduce activity, parser 110 replaces the top-most k symbols with a non-terminal symbol according to a production rule.

| (1) Nonterminal: | TerminalOrNonterminal_1 |
| | ... |
| | TerminalOrNonTerminal_k |
| | { action code } |

Using YACC, action code can be embedded in grammars describing target languages. Such action code is often written in C and can be used to manipulate symbol tables and construct parse trees when dealing with non-trivial target languages. The action code can also be used for code generation or for directly interpreting target language constructs when dealing with relatively simple languages.

Consider a simple grammar, G, with nonterminals {S,B}, terminals {a,b}, and three production rules as follows:

(2.1) G : S B (2.2) S : a (2.3) B : b

Given input steam 116 containing "a b b b b", FIG. 1 illustrates the state of parsing operation after the following sequence of operations:

shift reduce (2.2)

shift reduce (2.3)

reduce (2.1)

shift

The next parser operation is a reduction with rule 2.3, and currently, cursor 118 of lexical analyzer 112 points to the end position of the second "b", the terminal symbol to be consumed by the next reduction.

Generally, in order to apply a YACC production rule such as production rule (1) in a reduction, parser 110 repetitively invokes lexical analyzer 112 and performs shift operations. During each iteration, parser 110 determines whether the top-most k symbols on stack 114 match the right-hand side of production rule (1) by examining the current parser state and the next input token.

When the top-most k symbols on stack 114 match the right-hand side of production rule (1) parser 110 performs a reduction based on production rule (1). Parser 110 replaces the top-most k symbols with the left-hand side symbol of (1). After the reduction, any associated action code is executed. At this point, cursor 118 of lexical analyzer 112 stays at the ending position of the scanned input stream 116, or the ending position of a subsentence derived from production rule (1)'s left-hand symbol, in this case, the construct Nonterminal.

In the event that parse tree construction code is embedded in the associated action code, a node for the construct Nonterminal would be created. This node represents the derivation of a subsentence by Nonterminal. A partial correspondence from the parse tree node to the source code location of its subsentence can also be established by storing the position of cursor 118 of the lexical analyzer 112 in the node. The correspondence is partial since only the end position of the subsentence is available.

A novice YACC developer might suggest establishing a full correspondence by associating action code with the production rule. Action code could be added to the beginning of production rule (1) for creating the parse tree node and setting the start position of a subsentence. While action code could be added at the end of production rule (1) for setting the end position.

Unfortunately, the applicability of this straightforward solution is rather limited. Most target languages include empty production rules —rules with an empty right-hand side. This solution will only work when the target languages are simple enough that additional empty production rules would not introduce ambiguities into the grammar.

YACC introduces a new empty rule for action code inserted in the middle of a production rule. Thus, if action code was added at the beginning of the rules, the reduction of the corresponding empty rules and the subsequent execution of the action code would occur with cursor 118 of lexical analyzer 112 pointing at the starting position of a subsentence. For a complex grammar, this approach would greatly increase the number of actual grammar rules. It is quite likely that the large number of empty rules would alter the definition of the original language.

Prior Art Parse Trees

Figure 2:
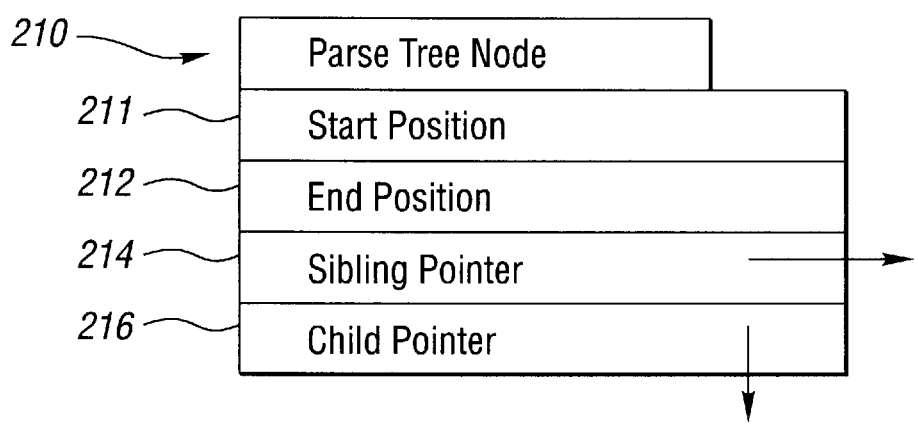
FIG. 2 is a diagram illustrating the record structure of a prior art parse tree node record.

Referring now to FIG. 2, there is illustrated a prior art parse tree node data structure. Parse trees are represented as binary trees using linked lists. As the number of offsprings of a node in a parse tree varies from node to node, these parse trees are actually generalized binary trees.

A typical prior art parse tree node is represented using data structure 210. Each node includes two pointers. Child pointer 216 associates a node with its first offspring. Sibling pointer 214 associates a node with its next sibling. Thus, all offsprings of a node can be found by traversing its child pointer 216 followed by sibling pointers 214.

In addition to pointers for traversing the parse tree, data structure 210 also includes StartPosition field 211 and EndPosition field 212. StartPosition field 211 is used to keep track of the first position of the symbol sequence associated with a node. Likewise, EndPosition field 212 is used to keep track of the last position of the symbol sequence associated with a node.

Each node in a parse tree represents a sequence of terminal symbols. StartPosition field 211 establishes a partial correspondence between the node and the sequence of terminal symbols the node derives. A complete correspondence is established when StartPosition field 211 is used in conjunction with EndPosition field 212.

Without StartPosition field 211, determining the first position of a node's symbol sequence would require access to its parent node. There are two alternatives for deriving this information. The first alternative is to add a third pointer to node data structure 210 which points to a node's parent. The second alternative is to perform a tree traversal to find a node's parent when needed.

The first approach is unsatisfactory as it provides no benefit. The memory space saved by eliminating StartPosition 211 would be used by the new pointer.

The drawback of the second approach is that it would result in considerable performance deterioration. Consider the following simple grammar:

```
S → aPb
P → cQd
Q → Pe | e
```

Further, consider a sentence, x, in the language of the grammar:

```
accededb
12345678
```

The numbers beneath the individual symbols indicate their positions. Thus, the position of the symbol "a" is 1; the position of the first "e" is 4; and the location of the substring "ced" is [3,5]. The canonical derivation sequence of x is as follows:

```
S →
aPb →
acQdb →
acPedb →
accQdedb →
accededb
```

Figure 3:
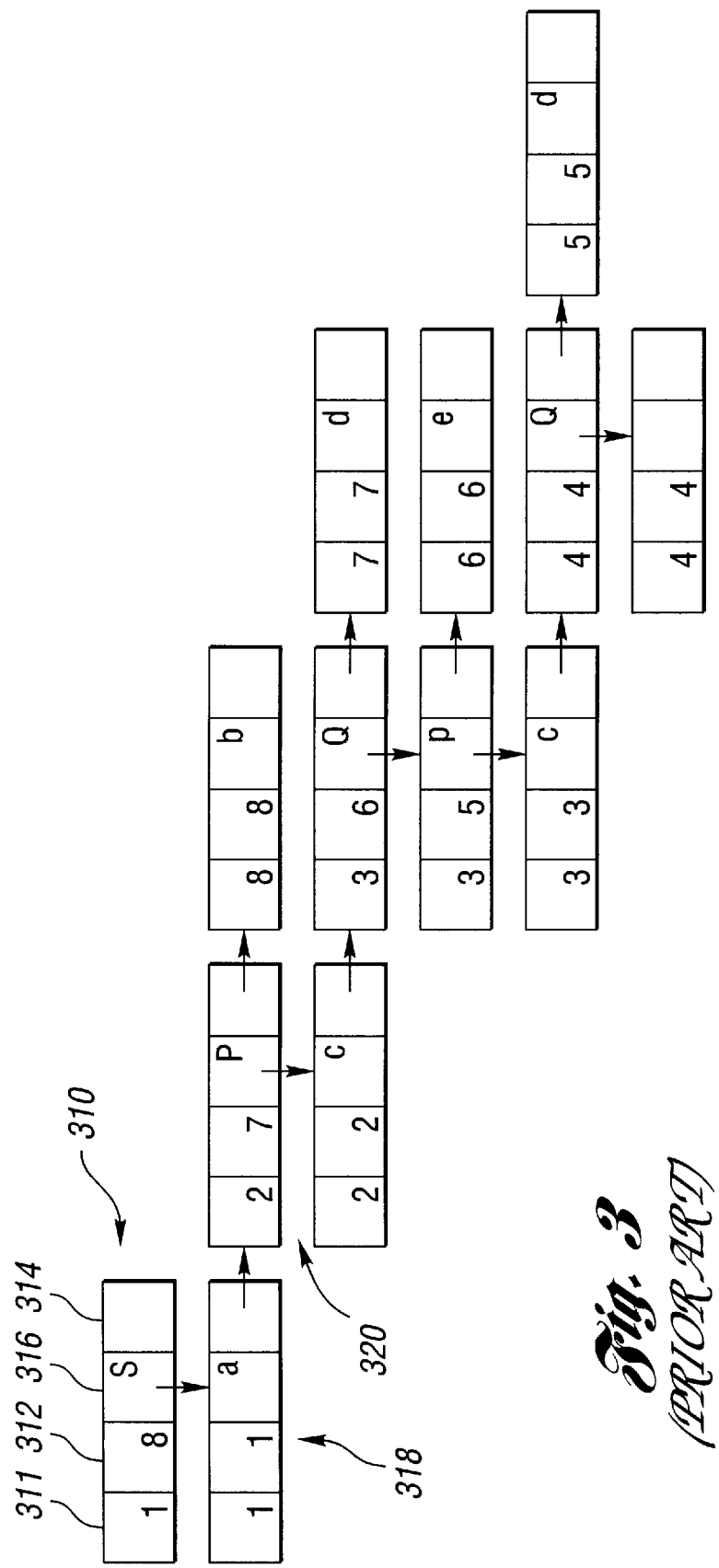
FIG. 3 is a diagram illustrating a prior art parse tree.

Referring now to FIG. 3, there is illustrated a representation of this derivation sequence as a parse tree using data structure 210. The directions of the arcs are assumed left-to-right and top-down, respectively. The grammar symbol each node represents is also noted in the diagram for easy identification.

Node 310 is representative of the nodes of the parse tree illustrated in FIG. 3. Node 310 includes child pointer 316, sibling pointer 314 and EndPosition field 312.

Child pointer 316 points to node 318. Node 318 is the first child of node 310. Sibling pointer 314 contains nil because node 310 has no siblings. Start-Position field 311 contains the value 1 indicating that the first position of the code segment associated with node 310 is 1. EndPosition field 312 contains the value 8 indicating that the last position of the source code segment associated with node 310 is 8.

Using this prior art parse tree, identifying the location of a source code segment associated with a node requires lexical analyzer 112 to derive of the segment's first position which requires a parse tree traversal. A parse tree traversal for this simple sentence results in minor performance degradation when the parse tree is generated. As the complexity of either the language or the sentence increases, however, so does the level of performance degradation. In addition, this prior art parse tree reserves memory for the StartPosition field associated with each node.

The Data Structure Of The Present Invention

Figure 4:
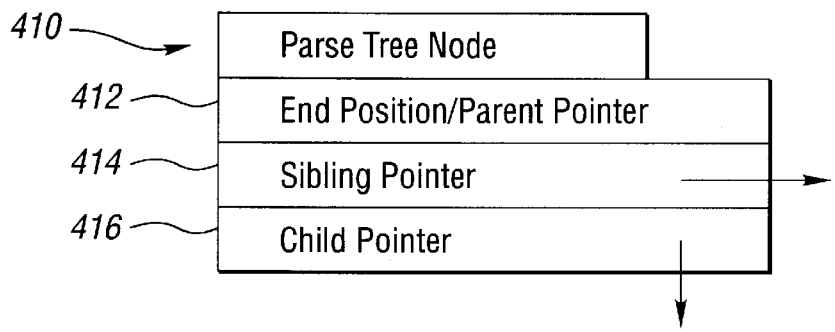
FIG. 4 is a diagram illustrating the record structure of an improved parse tree node record.

Referring now to FIG. 4, there is illustrated a parse tree node data structure 410 in accordance with the present invention. Each node includes two pointers. Child pointer 416 associates a node with its first offspring. Sibling pointer 414 associates a node with its next sibling. These pointers perform substantially the same functions as child pointer 216 and sibling pointer 214, respectively.

Data structure 410 also includes EndPosition/ParentPointer field 412. Field 412 is a variant field which is used in performing two functions. For nodes which are a rightmost child node, the EndPosition/ParentPointer field 411 contains a pointer to the node's parent. For all other nodes, the EndPosition/ParentPointer field 412 contains the last position occupied by the symbol sequence associated with the node.

Using data structure 410, the present invention overcomes the deficiencies of the prior art without requiring additional memory space and without incurring unacceptable performance degradation. An observation that makes the method of the present invention feasible is that in a parse tree representation, a node corresponding to a non-terminal symbol always has the same end position as its right-most child node.

To take the advantage of this observation, the method of the present invention eliminates StartPosition field 211 from the prior art data structure. Further, the present invention utilizes the fields of the prior art data structure differently. In particular, the method of the present invention interprets EndPosition/ParentPointer field 412 of a right-most child node as a pointer to its parent node.

This interpretation is possible because the end position of a right-most child node is always the same as that of its parent node. Note that the rightmost child nodes are those whose sibling pointer contains nil.

Figure 5:
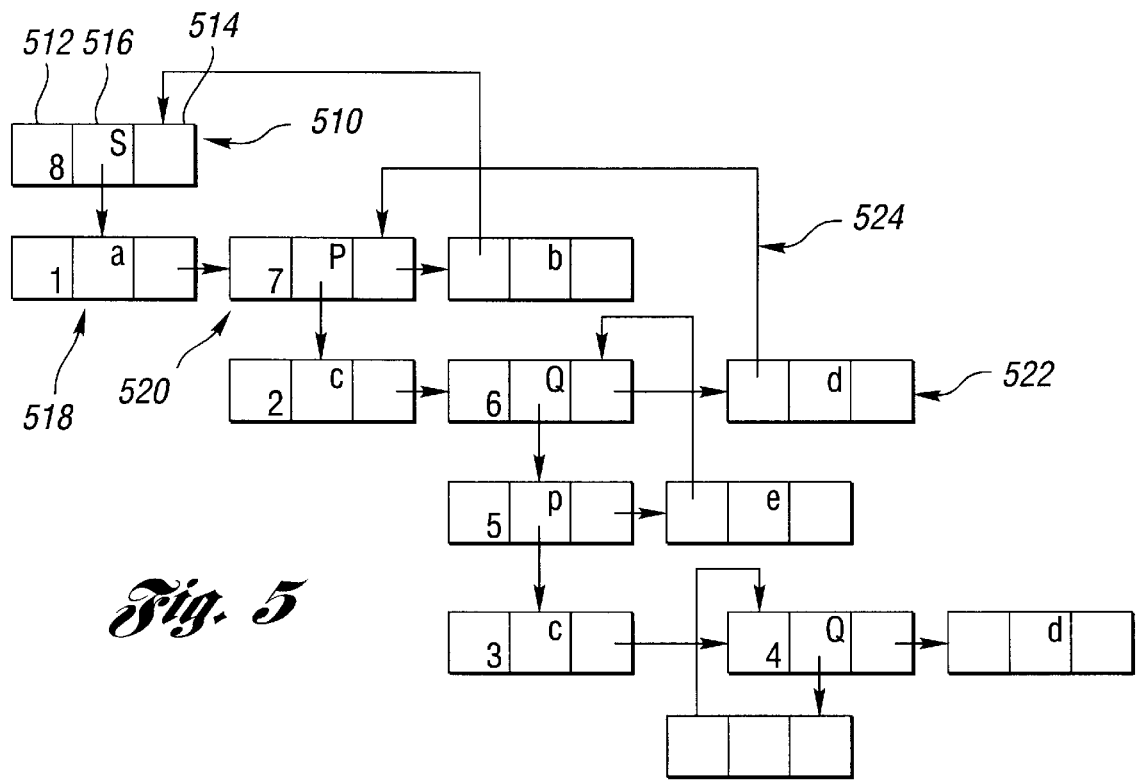
FIG. 5 is a diagram illustrating an improved parse tree in accordance with the present invention.

FIG. 5 illustrates the parse tree for the derivation sequence in accordance with the present invention. The revised interpretation of the EndPosition/ParentPointer field as a variant field is illustrated by reference numeral 524. The EndPosition/ParentPointer field of node 522 contains a pointer 524 to its parent node 520. Node 522 is the rightmost child of node 520.

Finding a parent node in accordance with the method of the present invention is a matter of following the parent pointer contained in the EndPosition/ParentPointer field of one's right-most sibling node. The performance cost of such an operation typically involves a couple to half a dozen pointer traversals, as is the case of this example.

The control logic for determining source code locations of parse tree nodes is outlined below. Using a functional style, the control logic is presented as a collection of functions. Control Logic: Determining source locations of parse tree nodes.

```
Node = childPointer, siblingPointer, endPosition |
parentPointer
startposition =
    λn: Node if (p = nil)
            then 1
            else (1 +
                  endposition (leftsibling
p.childPointer n))
        where p = parent n
endposition =
    λp: Node if (p< >nil)
            then if (rightmostsibling n)
                then endposition p
                else n.endPosition
            else n.endPosition
        where p = parent n
leftmostsibling =
    λp, n: Node if (p.childPointer = n)
            then True
            else False
rightmostsibling =
    λn: Node if (n.siblingPointer = nil)
            then True
            else False
leftsibling =
    λs, n: Node if (s.siblingPointer = n)
            then s
            else (leftsibling s.siblingPointer n)
parent =
    λn: Node if (rightmostsibling n)
            then n.parentPointer
            else (parent n.siblingPointer)
```

Note that the "parent" function described above returns a nil for the root node. The root node is the node pointed to by a global pointer to a parse tree. Such a conditional test, however, is omitted from the "parent" function.

Some example computations of the two functions, "startposition" and "endposition" are shown below, based on the parse tree of FIG. 4. The notation Node[P] represents the node corresponding to grammar symbol "P". Multiple occurrences of a symbol are further differentiated with a number i, indicating the ith occurrence of a symbol from left-to-right.

startposition(Node[P]) =2 endposition(Node[P]) =7 startposition(Node[d]) =7 endposition(Node[d]) =7 startposition(Node[c, 2]) =3 endposition(Node[c, 2]) =3

While the best mode for carrying out the invention has been described in detail, those familiar with the art to which this invention relates will recognize various alternative designs and embodiments for practicing the invention as defined by the following claims.

What is claimed is:

1. A method for constructing a parse tree, the parse tree having a plurality of nodes represented by parse tree node records, each record being associated with a source code segment having a start location and an end location, the method comprising:

storing a first value in a child pointer field of a record, the first value being selected from a group of nil and a child node address;

storing a second value in a sibling pointer field of the record, the second value being selected from a group of nil and a sibling node address;

providing a variant field for the record;

selecting a third value from a group consisting of a parent node address and an end position; and storing the third value selected in the variant field of the record.

2. The method of claim 1 wherein selecting a third value includes:

calculating an end position when a node represented by the record has a sibling; and calculating a parent node address when the node represented by the record lacks a sibling.

3. A method for identifying a source code segment associated with a first parse tree node record, wherein a start position of the source code segment is determined based on a field of a second node record, the method comprising:

determining the start position based on a variant field of the first node record and a variant field of the second node record wherein the variant fields of the first and second node records have contents selected from a group consisting of a parent node address and an end position; and determining an end position based on the variant field of the first node record.

4. The method of claim 3 wherein determining an end position includes:

determining the end position to equal the value of the variant field when the first node record fails to represent a last child node;

determining the end position to equal the end position of a parent node when the first node record represents a last child node.

* * * * *